United States Patent [19]
Elliot

[11] Patent Number: 5,305,823
[45] Date of Patent: Apr. 26, 1994

[54] ZONE CONTROLLED AUTOMOBILE AIR CONDITIONING SYSTEM WITH AIR MIXERS AT SELECTED OUTLETS

[75] Inventor: Gilles Elliot, Courcouronnes, France

[73] Assignee: Valeo Thermique Habitacle, Le Mesnil-Saint-Denis, France

[21] Appl. No.: 670,939

[22] Filed: Mar. 18, 1991

[30] Foreign Application Priority Data

Mar. 22, 1990 [FR] France .................. 90 03687

[51] Int. Cl.$^5$ .............................. B60H 1/00
[52] U.S. Cl. .......................... 165/41; 165/42; 165/43; 237/12.3 A; 237/12.3 B; 366/337; 454/156; 137/896
[58] Field of Search ............ 165/16, 22, 42, 43, 165/41; 98/2.01, 2.08, 2.09, 2.11; 237/12.3 A, 12.3 B, 2 A; 137/896; 366/337, 338

[56] References Cited

U.S. PATENT DOCUMENTS

| | | | |
|---|---|---|---|
| 3,289,413 | 12/1966 | Gist, Jr. ................. | 366/337 |
| 3,362,431 | 1/1968 | Chaulin ................. | 137/896 |
| 3,470,912 | 10/1969 | Bydal ................... | 366/340 |
| 3,506,244 | 4/1970 | Strang .................. | 137/896 |
| 3,751,009 | 8/1973 | Archer .................. | 366/337 |
| 3,893,654 | 7/1975 | Miura et al. ........... | 366/337 |
| 4,179,222 | 12/1979 | Strom et al. ........... | 366/337 |
| 4,207,009 | 6/1980 | Glocker ................. | 366/337 |
| 4,390,124 | 6/1983 | Nilsson ................. | 165/41 |
| 4,420,115 | 12/1983 | Matsushima et al. .... | 237/12.3 A |
| 4,482,009 | 11/1984 | Nishimura et al. ..... | 165/22 |
| 4,582,252 | 4/1986 | Ogihara et al. .. | |
| 4,842,047 | 6/1989 | Sakurada et al. .. | |

FOREIGN PATENT DOCUMENTS

| | | | |
|---|---|---|---|
| 602662 | 8/1960 | Canada ................. | 137/896 |
| 0210548 | 2/1987 | European Pat. Off. .. | |
| 3048195 | 9/1982 | Fed. Rep. of Germany . | |
| 0211123 | 9/1986 | Japan ................. | 237/12.3 A |
| 0064815 | 3/1988 | Japan ................. | 98/2.11 |
| 376476 | 5/1964 | Switzerland ........... | 366/337 |

*Primary Examiner*—John K. Ford
*Attorney, Agent, or Firm*—Dennison, Meserole, Pollack & Scheiner

[57] ABSTRACT

In a heating and ventilating apparatus for the cabin of an automotive vehicle with a facility for supplying air at different temperatures to the driver and the front passenger at the level of the fascia and at the level of their feet, means are provided to ensure that air used for other purposes shall, where necessary, be at a uniform temperature. The apparatus comprises a housing having a fresh air inlet duct and at least three outlet ducts for fresh or heated air. The housing has a central bulkhead which divides the housing into two separate halves, each containing a separate regulating means for regulating the temperature delivered from that half of the housing into the cabin of the vehicle. The de-icing outlet duct and/or the central fascia ventilating air outlet duct are provided with a mixer for ensuring that the temperature delivered through the corresponding outlet duct is uniform.

6 Claims, 5 Drawing Sheets

ZONE CONTROLLED AUTOMOBILE AIR CONDITIONING SYSTEM WITH AIR MIXERS AT SELECTED OUTLETS

FIELD OF THE INVENTION

This invention relates to a heating and ventilating apparatus for the cabin of an automotive vehicle, for delivering air separately at different locations in the front part of the cabin and having separate means for regulating the temperature of the air delivered to these various locations.

BACKGROUND OF THE INVENTION

An apparatus of this type is already known that has a housing which contains a fresh air inlet duct and at least three air outlet ducts for fresh or heated air. The outlet ducts serve respectively for air which is used for de-icing the windshield, for ventilating the cabin at the level of the fascia (this being the central or main air supply or ventilating outlet), and for delivering warm air to the lower part of the cabin, e.g. for foot warming purposes. The housing has a central bulkhead which divides the housing into two separate halves, each of which contains a separate regulating means for regulating the air temperature in that half of the housing. The central bulkhead extends at least partly into each of the outlet ducts, so that air at different temperatures from the two halves of the housing can be delivered respectively to the two front seats in the cabin, i.e. the right hand side and the left hand side of the front part of the cabin.

The de-icing outlet duct feeds at least one de-icing vent, and typically two de-icing vents, which are arranged respectively on the right and left hand sides of the windshield. The main air supply outlet duct feeds at least two outlet vents in the fascia, typically one on the right, one on the left, and a third one in the middle of the fascia. Finally the warm air or foot warming outlet duct feeds two vents which are arranged in the lower part of the cabin, one near the feet of the driver and one near the feet of the front passenger.

With that arrangement, the two occupants of the front seats, i.e. the driver and the front passenger, are each able to regulate individually the temperature of the air delivered into the cabin on their own side of the latter. This leads to improved comfort, while the air is distributed in identical ways in the two halves of the housing of the apparatus.

However, this known arrangement does involve drawbacks under certain circumstances in use. In particular, there is a problem when the occupants of the two front seats want very different air temperatures from each other. For example, if the driver wants air at a moderate temperature and the front passenger wants much hotter air, then the result will be that air delivered behind the windshield will be much hotter on the passenger's side than on the driver's side. This can lead to difficulties in ensuring proper de-icing and/or de-misting of the windshield on the driver's side, which in turn can be prejudicial to the driver's visibility through the windshield. This can be prejudicial to safety.

In the same example, the air delivered through the fascia vents will be hotter on the passenger's side than on the driver's side. This difference will manifest itself essentially at the level of the central fascia vent. Then, given a distribution configuration of the "bi-level" kind (with temperature stratification, in which the air delivered at the fascia vents is required to be cooler than that delivered into the lower part of the cabin), what happens is that air emitted from the central fascia vent emerges in the form of two layers, namely a cold upper layer and a hot lower layer. This is most uncomfortable to the occupants of the vehicle.

It is therefore desirable, at least under certain circumstances, to be able to deliver air towards the windshield and/or towards the fascia vents at a homogeneous temperature, while at the same time retaining the facility for having different air temperatures in the lower part of the cabin in the vicinity of the driver's feet and of the passenger's feet respectively. At the same time it is desirable to preserve the facility for delivering air at different temperatures as between the right and left hand sides of the fascia.

DISCUSSION OF THE INVENTION

With the above aims in view, the invention provides a heating and ventilating apparatus for the cabin of an automotive vehicle, of the kind comprising a housing having a fresh air inlet duct and at least three outlet ducts for fresh or heated air, directed respectively to the de-icing of the windshield, ventilation at the level of the fascia, and heating of the lower part of the cabin, the housing being provided with a central dividing bulkhead to divide the housing into two separate halves, with each of the said halves including separate regulating means for regulating the air temperature, wherein the said central bulkhead extends at least partly into each of the outlet ducts, to enable airstreams to be delivered into the right hand side and the left hand side of the cabin at different temperatures, wherein a mixer member is arranged in the de-icer outlet duct and/or in the main ventilation air supply duct (e.g. a central fascia vent) for giving the air emitted by the outlet duct concerned a homogeneous temperature.

The invention thus enables the temperature of the air delivered towards the windshield and/or that of the air delivered towards the ventilation or fascia vents to be made homogeneous, without affecting the regulation of the temperature of the airstreams which are transmitted respectively towards the driver's feet and the passenger's feet, and equally without affecting the temperature of the airstreams transmitted towards the two sides of the fascia.

In one embodiment of the invention, a said mixer member is disposed in the de-icer outlet duct downstream of the central bulkhead of the housing, so as to produce a uniform air temperature for de-icing the windshield.

Such a mixer member may be in the form of a plate which extends at right angles to the central bulkhead and which is provided with deflector means on each of its two side faces for diverting the airstreams issuing respectively from the two halves of the housing into directions which together define a cross-shaped configuration along the said side faces of the plate.

The mixer member may also be in the form of a plate which extends as an extension of the central bulkhead, and which has, respectively, on its two side faces, two scoop-shaped elements, each of which is adapted to capture the air flowing on one side of the plate so as to transfer it on to the opposite side of the plate through an opening formed in the plate.

In another form of apparatus in accordance with the invention, such a mixer member is disposed in the main ventilation air outlet duct downstream of the central bulkhead of the housing, whereby to give a uniform temperature to the air to be delivered for ventilation of the cabin at the level of the fascia.

The mixer member may be in the form of a plate which extends as an extension of the central bulkhead and which has deflector means on each of its two side faces, for diverting the airstreams issued from each said half of the housing into directions along the said side faces of the plate with these directions together defining a cross-shaped configuration.

In a modified form of apparatus according to the invention, the mixer member is in the form of a plate which extends at right angles to the central bulkhead and which is provided, respectively, on its two side faces, with two scoop-shaped elements, each of which is adapted to capture the airstream flowing on one side of the plate so as to transfer it on to the opposite side of the plate through an opening formed in the plate.

The deflector means may be either in the form of fins or ailerons disposed on the two respective side faces of the plate and oriented obliquely to each other, or scoop-shaped elements, the deflector means being adapted to capture the airstream flowing respectively on the two sides of the plate and to divert them into directions defining a cross-shaped configuration with each other.

In the case in which a said plate is at right angles to the central bulkhead of the housing, it may comprise either a small fixed partition wall, or else a flap-type valve member which is mounted for pivoting movement about an axis disposed at right angles to the central bulkhead.

Where a said plate defines an extension of the central bulkhead of the housing, then the plate may actually be part of the central bulkhead.

Preferred embodiments of the invention will now be described, by way of example only and with reference to the accompanying drawings.

DESCRIPTION OF PREFERRED EMBODIMENTS OF THE INVENTION

Figure 1:
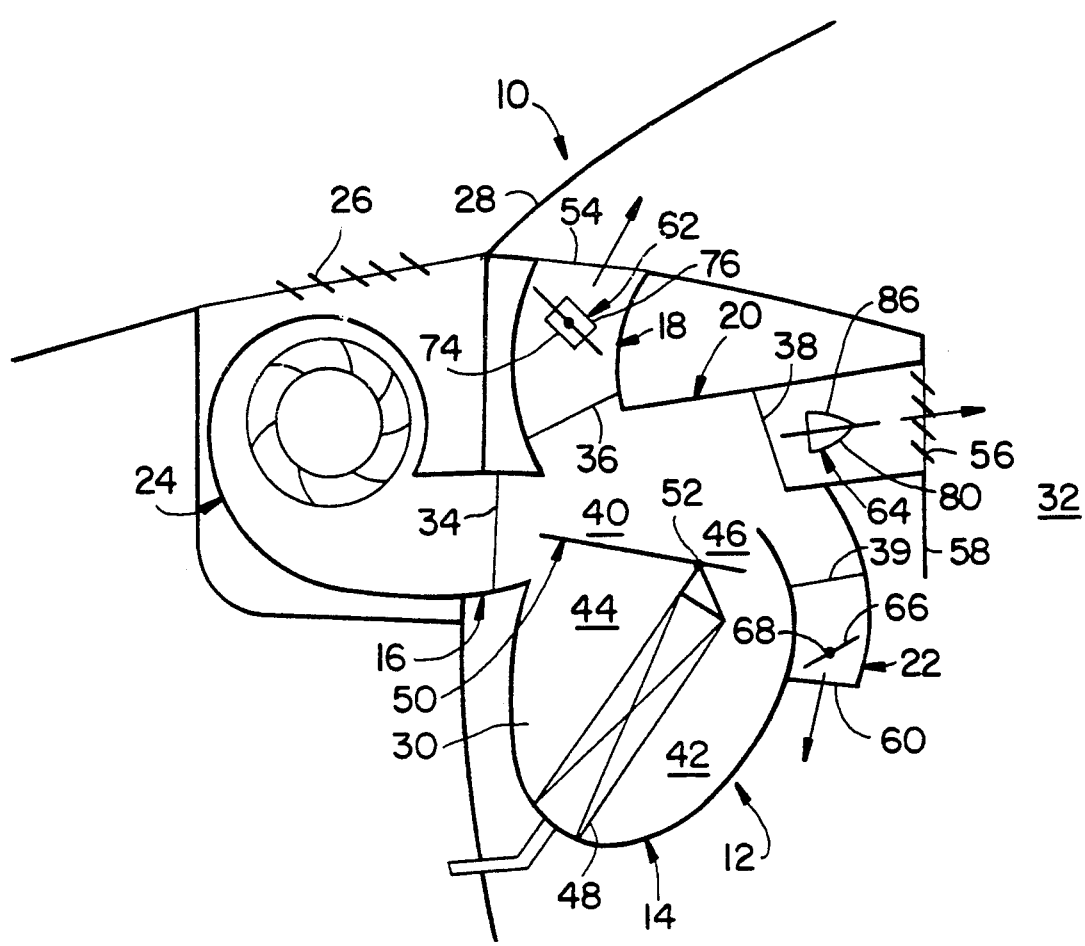
FIG. 1 is a partial view in a cross section which is longitudinal with respect to a vehicle equipped with a heating and ventilating apparatus in accordance with the invention, showing the apparatus somewhat diagrammatically.

Reference is first made to FIG. 1, which shows an automotive vehicle 10, for example an automobile, which is equipped with a heating and ventilating apparatus 12. This apparatus comprises a housing 14 which has a fresh air inlet duct 16 and three outlet duct 18 for fresh or heated air, namely a de-icer outlet duct 18 for de-icing the windshield of the vehicle, a main or central outlet duct 20 for supplying ventilating air at the level of the fascia of the vehicle, and a foot warming outlet duct 22 for supplying warm air for heating the lower part of the cabin of the vehicle.

The fresh air inlet duct 16 is connected to the delivery side of a motorised fan unit 24, which may be supplied with fresh air from outside the vehicle through an air inlet grille 26 mounted in front of the windshield 28 of the vehicle. The motorised fan unit 24 is thus able to deliver fresh air from outside into the inlet duct 16 of the housing 14. If required, an evaporator may be interposed between the outlet of the motorised fan unit 24 and the fresh air inlet duct 16, so as to enable fresh air or conditioned air to be delivered into the inlet duct 16.

The housing 14 is provided with an internal central bulkhead 30, which extends vertically and in the longitudinal plane of the vehicle, so as to define, within the housing 14 and on either side of the bulkhead, two generally symmetrical, separate chambers of substantially equal size. These chambers are located respectively on the right hand side and the left hand side, with respect to the cabin 32. The bulkhead 30 extends across the full width of the inlet duct 16, to terminate in a free edge 34 of the bulkhead. It also extends partly into the de-icer outlet duct 18, up to a terminal edge 36 of the bulkhead, and partly into the main outlet duct 20 up to a terminal edge 38 of the bulkhead. As to the outlet duct 22, the bulkhead 30 also extends into this duct, to terminate in an edge 39.

That half of the housing 14 which is situated on the left hand side of the cabin 32 is shown in FIG. 1; the other half, situated on the right hand side of the cabin, is of course hidden by the central bulkhead 30.

The housing 14 comprises a number of walls extending transversely or longitudinally (i.e. having parallel generatrices). Each of the two halves of the housing (for example the left hand half which is seen in FIG. 1) includes a fresh air transmission branch 40 which is interposed between the inlet duct 16 and the outlet ducts 18, 20 and 22. This half of the housing also includes an air heating branch 42, generally U-shaped in section and interposed between the inlet duct 16 and the outlet ducts 18, 20 and 22. The air heating branch 22 has an inlet 44 and an outlet 46, which communicate with the fresh air transmission branch 40, respectively, on the same side as the inlet duct 16 and on the same side as the outlet ducts 18, 20 and 22.

The other half of the housing (not shown in FIG. 1) also includes a fresh air transmission branch and an air heating branch. A heating radiator 48 is mounted inside the housing, and extends over the whole width of the latter. The radiator 48 is arranged for the engine cooling fluid of the vehicle to flow through it. The radiator heats the air both in the heating branch 42 of the left hand half of the unit, and in the other, symmetrical, heating branch in the right hand half.

In the left hand half of the housing, a mixing valve 50 is pivotally mounted about a horizontal axis 52, for controlling the distribution, between the two branches 40 and 42, of the stream of air delivered through the inlet duct 16. Consequently the mixing valve 50 controls the temperature of the air leaving through the outlet ducts 18, 20 and 22 from the left hand side of these ducts. A similar mixing valve is mounted in the right hand half of the housing, and is controlled independently of the valve 50. This enables the temperature of the air delivered from the right hand half to each of the outlet ducts 18, 20 and 22 to be controlled independently.

The duct 18 serves at least one air vent 54 situated at the base of the windshield. In this example there are two of these vents, one on the left hand side and one on the right hand side of the windshield. Correspondingly, the outlet duct 20 serves two side air vents which are arranged respectively on the right and on the left of the fascia 58 of the vehicle, together with a central fascia air vent 56. Finally, the outlet duct 22 feeds two ducts 60 which are arranged respectively on the right and left hand sides of the cabin. Since the apparatus has two independently controlled mixing valves, it is possible normally to adjust separately the temperature of the air distributed via the two halves of the housing into each of the outlet ducts 18, 20 and 22, even though the distribution of this air is common for both halves of the housing.

In the outlet duct 18, upstream of the edge 36 of the central bulkhead 30, a mixer 62 is arranged. The mixer 62 is adapted to mix the two air streams delivered respectively from the two halves of the housing, so as to ensure a uniform temperature in the air which is used for de-icing the windshield 28. Similarly, another mixer 64 is arranged inside the main air outlet duct 20, downstream of the edge 38 of the central bulkhead 30, for mixing the fresh air from the branch 40 with the warm air from the branch 42. By contrast, the two air streams which are delivered to the outlet duct 22 from the two halves of the housing are emitted separately via the two air vents 60, without being previously mixed. A small flap-valve 66 is provided in each of the two halves of the outlet duct 22, each of these valves being pivotally mounted about an axis 66 for regulating the flow of air delivered to each air vent 60.

Figure 2:
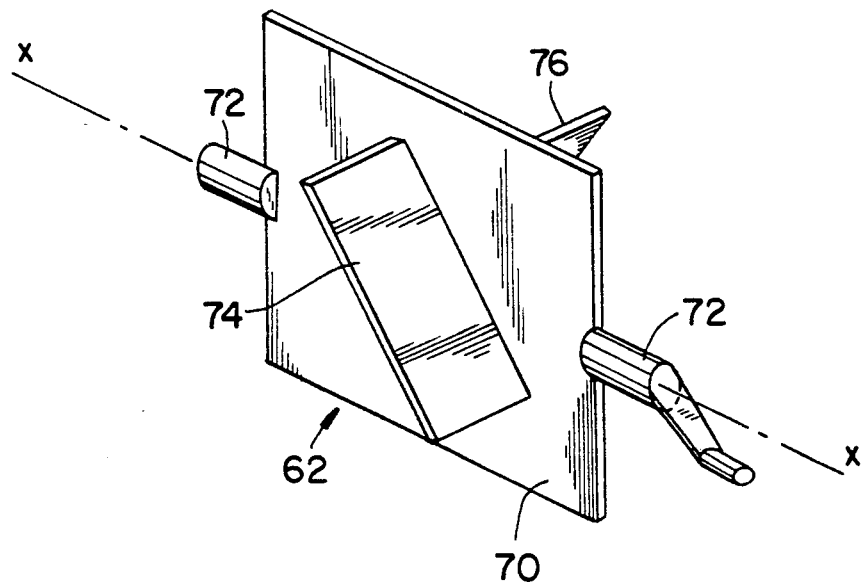
FIG. 2 is a perspective view of the mixer which is mounted in the de-icing outlet duct of the apparatus shown in FIG. 1.

Reference is now made to FIG. 2, in order to describe the structure of the mixer 62. This includes a plate 70 having two pivots 72 so that it constitutes a valve member or flap which is able to pivot about an axis XX which is horizontal and perpendicular to the central bulkhead 30 (FIG. 1). Two fins or ailerons 74 and 76 are mounted obliquely on the two respective faces of the plate 70. In this example the fins 74 and 76 are arranged so that together they define an X-shaped configuration, for capturing the two airstreams issuing respectively from the two halves of the housing, and for diverting them into intersecting directions in order to mix them.

Figure 3:
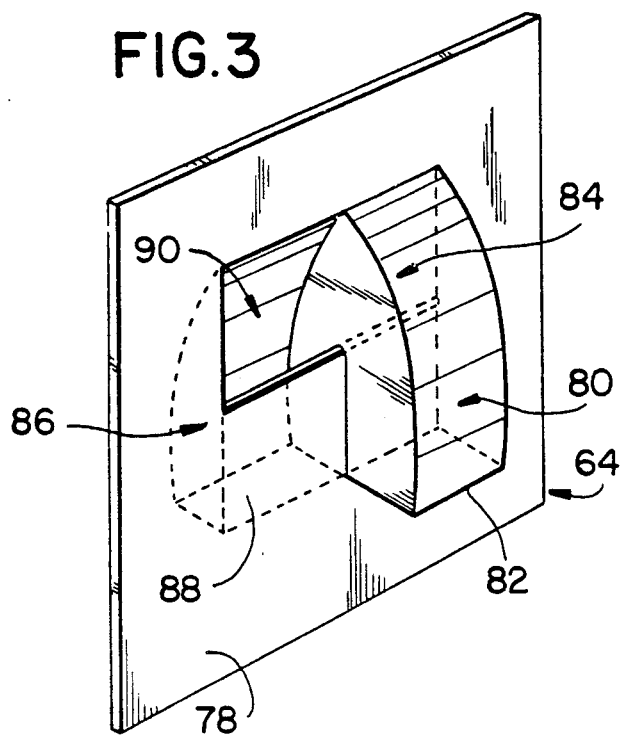
FIG. 3 is a perspective view of the mixer which is mounted in the central ventilating air supply duct of the apparatus shown in FIG. 1.
Figure 4:
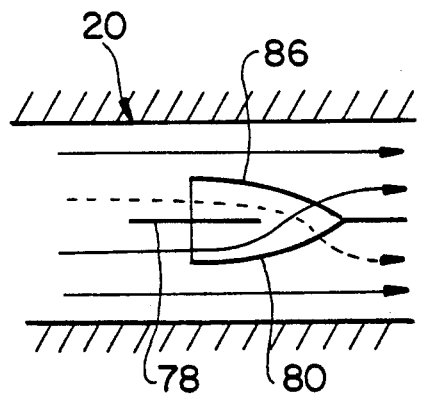
FIG. 4 is a view in transverse cross section of the mixer seen in FIG. 3, in the corresponding outlet duct.

Referring now to FIG. 3, which shows the mixer 64, this includes a plate 78, which is generally rectangular in shape and which has a scoop-shaped element 80 on one of its faces. The scoop 80 has an inlet opening 82, again generally rectangular in shape, and an outlet opening 84 of the same shape, both of these openings being disposed across the plane of the plate 78. The mixer 64 also includes a second scoop-shaped element 86, which is arranged on the other side of the plate 78 and which has an inlet opening 88 and an outlet opening 90, each of which is once again generally rectangular in shape, these openings being formed within the thickness of the plate 78. Arranged in this way, the two scoop-shaped elements 80 and 86 are each adapted to capture part of the airstream which flows on one side of the plate 78, so as to cause it to pass through the thickness of the plate 78 and to be discharged on its other side. As is shown in FIGS. 1 to 4, the plate 78 extends generally horizontally and at right angles to the plane of the central bulkhead 30. In this way "upper-lower" mixing of the air distributed through the central air vents 56 is ensured, i.e. mixing of the upper or fresh airstream with the lower or warm airstream.

Although the mixer element 64 is here mounted in a fixed position in the duct 20, it could be arranged in the form of a pivoting flap valve.

Figure 5:
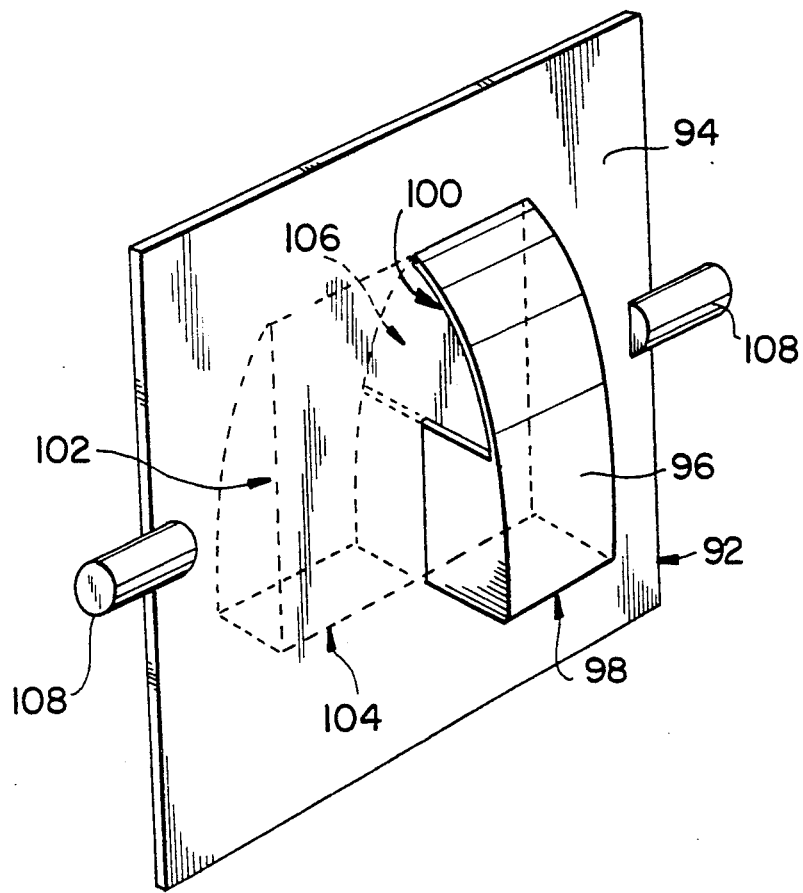
FIG. 5 is a perspective view of a mixer in the form of a pivoting valve member.

Reference is now made to FIG. 5, which shows a mixer member 92 which comprises a generally rectangular plate 94. On one of the faces of the plate 94, a scoop-shaped member 96 is mounted, this scoop 96 having an inlet opening 98 and an outlet opening 100, both the openings 98 and 100 being on the same side of the plane of the plate 94. A scoop-shaped element 104, which is arranged on the other face of the plate 94, has an inlet opening 104 and an outlet opening 106, with these two openings 104 and 106 being on the same side of the plane of the plate as each other.

The mixer member 92 may be arranged in a fixed position inside an outlet duct, or, again, it may be arranged as a pivoting flap-valve member, for which purpose two pivots 108, aligned with each other, may be provided on the plate 94. It will be understood that in that case the mixer member 92 may be used in place of the mixer member 62 in the de-icer outlet duct 18.

Figure 6:
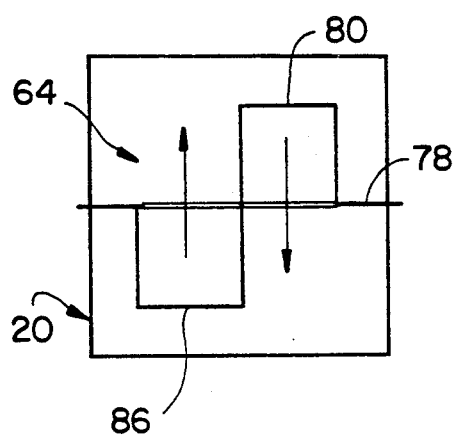
FIGS. 6 and 7 are views in cross section showing diagrammatically the orientation of the mixer of FIG. 3 in a central ventilating air supply duct and/or in a de-icing duct.

As is shown in FIG. 6, the mixer 64 can be arranged within the central air aupply duct 20, with its plate 78 then being arranged at right angles to the central bulkhead 30, in order to obtain a mixture of the upper and lower airstreams as is indicated by the arrows in FIG. 6.

Figure 7:
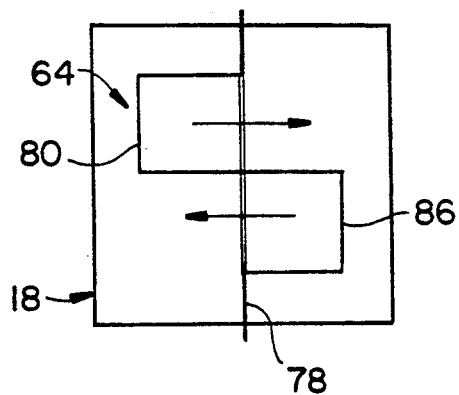

The mixer member 64 can also be arranged in the de-icer outlet duct 18 as shown in FIG. 7. In this case, the plate 78 of the mixer 64 is arranged in the same plane as the central bulkhead 30, and it may if desired actually be a part of the central bulkhead. The mixer 64 then enables the airstreams issuing from the two halves of the housing to be mixed, again as indicated by the arrows in FIG. 7.

Figure 8:
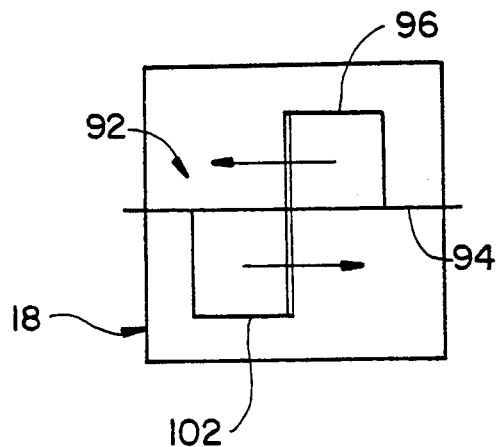
FIGS. 8 and 9 are views in cross section showing respectively the orientation of the mixer of FIG. 5 in a de-icing duct and/or in a central ventilating air supply duct.

Referring to FIG. 8, the mixer member 92 is here arranged inside the de-icer outlet duct 18, with its plate 94 at right angles to the plane of the central bulkhead 30.

Figure 9:
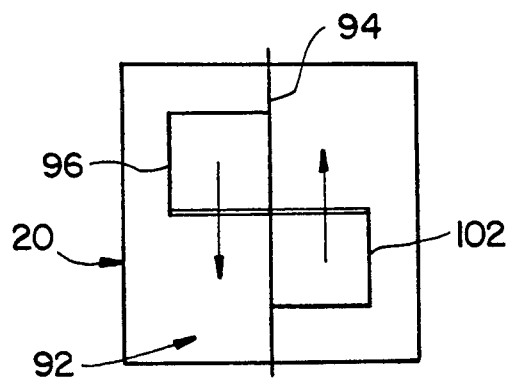

In the arrangement shown in FIG. 9, the mixer member 92 is mounted in the central air supply outlet duct 20 with its plate 94 in the same plane as the central bulkhead 30. Again, the plate 94 may if desired be part of the bulkhead 30 itself.

Figure 10:
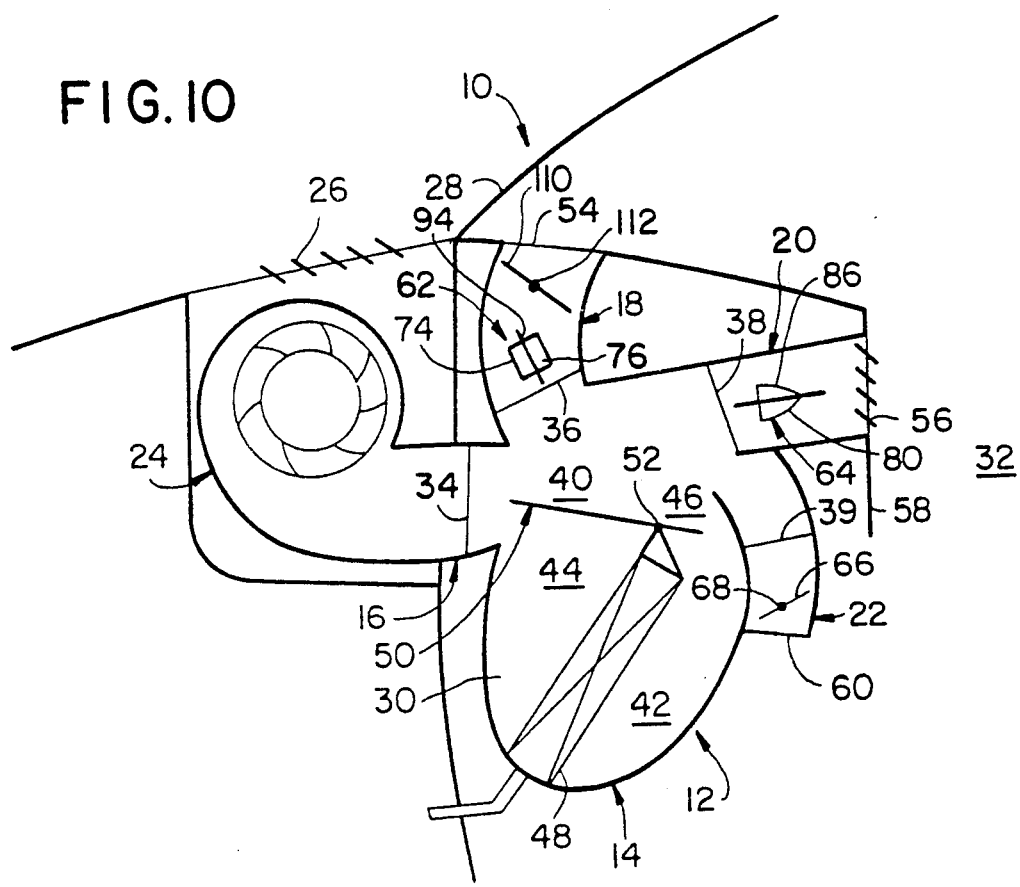
FIG. 10 is a view in cross section, similar to FIG. 1 but showing another embodiment of the invention.

Reference is now made to FIG. 10, which differs from FIG. 1 only in the structure of the mixing member which is disposed in the de-icer outlet duct 18. In this particular case, the mixer member 62 is mounted in a fixed position in the duct 18, with its plate 94 lying always at right angles to the plane of the central bulkhead 30 as in FIG. 1. The fins 74 and 76 are arranged to divert the two airstreams in the same way as in the arrangement described with reference to FIGS. 1 and 2, that is to say from the two halves of the housing. However, in the arrangement shown in FIG. 10, a flap valve 110 is mounted downstream of the mixer 62, so as to be pivotable about a horizontal axis 112 which extends transversely of the housing.

Figure 11:
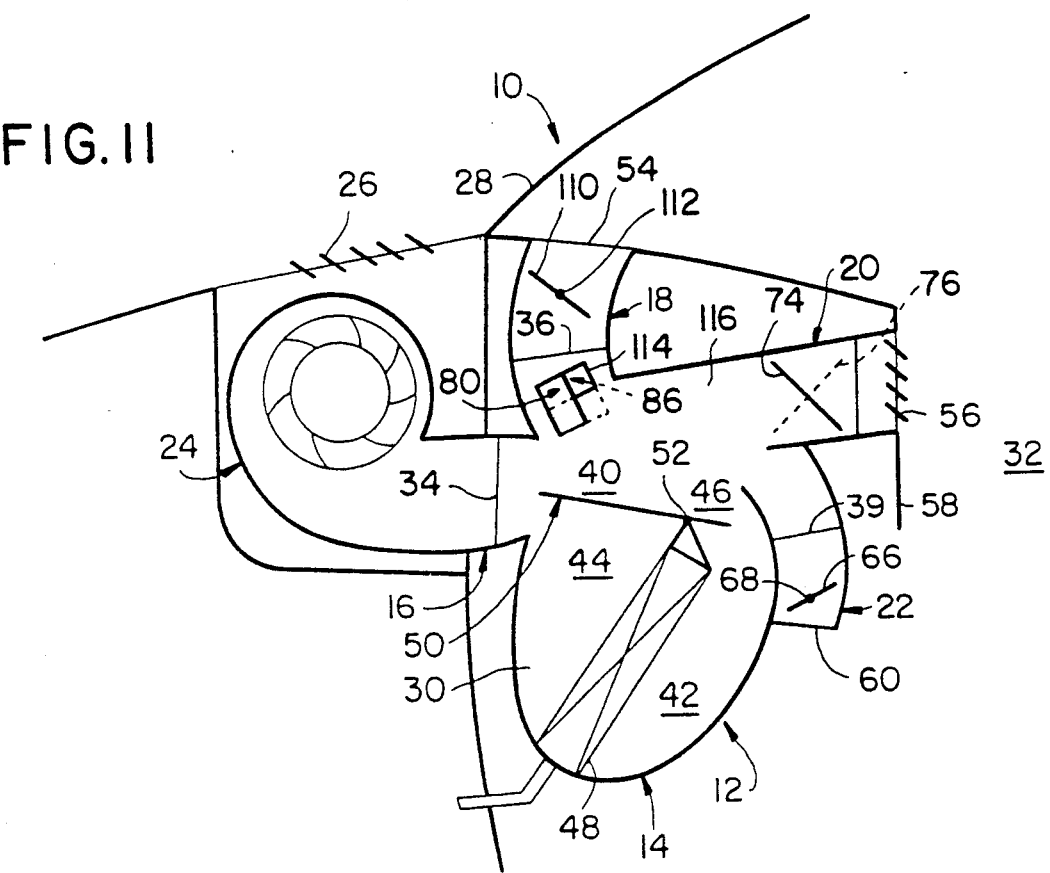
FIG. 11 is another view in cross section, again similar to FIG. 1 but showing yet another embodiment of the invention.

Reference is now made to FIG. 11, which shows a further embodiment. In this particular arrangement the central bulkhead 30 is extended into the de-icer outlet duct 18 and the main air supply outlet duct 20, by a greater amount than in the arrangements shown in FIGS. 1 and 10. Two scoop-shaped elements 80 and 86, similar to those in the mixer 64 shown in FIG. 3, are mounted on the portion 114 of the central bulkhead 30 which extends into the de-icer outlet duct 18. In addition, two fins 74 and 76, similar to those in the mixer 62 shown in FIG. 2, are arranged on the portion 116 of the central bulkhead 30 which extends into the central air supply outlet duct 20.

In the various embodiments described above, the mixer which is arranged in the de-icer outlet duct 18 causes mixing to occur, between the two airstreams which issue respectively from the two halves of the housing, in such a way as to give what may be referred to as "right-left" or "left-right" mixing. Similarly, the mixer in the main air supply outlet duct 20 ensures that mixing takes place between the two airstreams issuing respectively from each half of the housing in such a way as to give what may be called "upper-lower" or "lower-upper" mixing.

What is claimed is:

1. Heating and ventilating apparatus for the cabin of an automotive vehicle, comprising a housing, a fresh air inlet duct in the housing, and at least three air outlet ducts in the housing, the said outlet ducts comprising a windshield de-icer outlet duct, a ventilation air outlet duct for air to be delivered at the level of the fascia of the vehicle, and a foot warming air outlet duct for delivering warm air into a lower part of the cabin of the vehicle, the housing further comprising a central bulkhead dividing the interior of the housing into a left hand half and a right hand half, and regulating means, separate from each other and disposed respectively in each said half of the housing for regulating the temperature of the air therein, with the said central bulkhead extending at least partly into each of the said outlet ducts so as to enable airstreams at different temperatures to be delivered into the right hand half of the cabin and the left hand half of the cabin, the apparatus further comprising at least one mixer member disposed in at least one of the outlet ducts comprising the de-icer outlet duct and the ventilation outlet duct, whereby to give air emitted by the outlet duct concerned a homogeneous temperature, and wherein said at least one mixer member comprises a plate disposed as an extension of the central bulkhead, and two scoop-shaped elements arranged respectively on each said side face of the plate, for capturing the airstream flowing on one side of the plate whereby to transfer it to the opposite side of the plate, the plate further having an opening between its two said sides for the said airstream transfer to take place through the opening.

2. Heating and ventilating apparatus for the cabin of an automotive vehicle, comprising a housing, a fresh air inlet duct in the housing, and at least three air outlet ducts in the housing, the said outlet ducts comprising a windshield de-icer outlet duct, a ventilation air outlet duct for air to be delivered at the level of the fascia of the vehicle, and a foot warming air outlet duct for delivering warm air into a lower part of the cabin of the vehicle, the housing further comprising a central bulkhead dividing the interior of the housing into a left hand half and a right hand half, and regulating means, separate from each other and disposed respectively in each said half of the housing for regulating the temperature of the air therein, with the said central bulkhead extending at least partly into each of the said outlet ducts so as to enable airstreams at different temperatures to be delivered into the right hand half of the cabin and the left hand half of the cabin, the apparatus further comprising at least one mixer member disposed in at least one of the outlet ducts comprising the de-icer outlet duct and the ventilation outlet duct, whereby to give air emitted by the outlet duct concerned a homogeneous temperature, and wherein said at least one mixer member disposed in at least one of the outlet ducts comprising the de-icer outlet duct and the ventilating outlet duct is integrally formed with the respective portion of the central bulkhead extending at least partly into each of said outlet ducts.

3. Heating and ventilating apparatus for the cabin of an automotive vehicle, comprising a housing, a fresh air inlet duct in the housing, and at least three air outlet ducts in the housing, the said outlet ducts comprising a windshield de-icer outlet duct, a ventilation air outlet duct for air to be delivered at the level of the fascia of the vehicle, and a foot warming air outlet duct for delivering warm air into a lower part of the cabin of the vehicle, the housing further comprising a central bulkhead dividing the interior of the housing into a left hand half and a right hand half, and regulating means, separate from each other and disposed respectively in each said half of the housing for regulating the temperature of the air therein, with the said central bulkhead extending at least partly into each of the said outlet ducts so as to enable airstreams at different temperatures to be delivered into the right hand half of the cabin and the left hand half of the cabin, the apparatus further comprising at least one mixer member disposed in at least one of the outlet ducts comprising the de-icer outlet duct and the ventilation outlet duct, whereby to give air emitted by the outlet duct concerned a homogeneous temperature, and wherein said at least one mixer member comprises a plate which defines an extension of the central bulkhead, and deflector means arranged respectively on the two side faces of the plate for diverting airstreams issued from each said half of the housing into directions extending along the said side faces of the plate and defining a cross-shaped configuration with each other.

4. Apparatus according to claim 3, wherein said deflector means are in a form selected from, firstly, fine disposed respectively on the two side faces of the plate and oriented in oblique relationship to each other, and scoop-shaped elements, each arranged to capture an airstream flowing on the corresponding side of the plate whereby the scoop-shaped elements can capture the airstreams on both sides of the plate and divert them into directions defining a cross-shaped configuration with each other.

5. Heating and ventilating apparatus for the cabin of an automotive vehicle, comprising a housing, a fresh air inlet duct in the housing, and at least three air outlet ducts in the housing, the said outlet ducts comprising a windshield de-icer outlet duct, a ventilation air outlet duct for air to be delivered at the level of the fascia of the vehicle, and a foot warming air outlet duct for delivering warm air into a lower part of the cabin of the vehicle, the housing further comprising a central bulkhead dividing the interior of the housing into a left hand half and a right hand half, and regulating means, separate from each other and disposed respectively in each said half of the housing for regulating the temperature of the air therein, with the central bulkhead extending at least partly into each of the said outlet ducts but terminating before the respective outlet vent so as to enable airstreams at different temperatures to be delivered into the right hand half of the cabin and the left hand half of the cabin, the apparatus further comprising a first mixer member disposed in said de-icer outlet duct behind said de-icer duct vent, a second mixer member disposed in said ventilation air outlet duct behind said ventilation duct vent, said foot warming air outlet duct being free of any mixing member, whereby the air emitted by the de-icer duct and the ventilation duct is blended to promote temperature homogeneity while the air emitted directly by said foot warming air outlet is at a temperature determined by the setting of said regulating means.

6. The apparatus according to claim 5 wherein said first mixer member is integrated with the central bulkhead extending into said de-icer outlet duct and said second mixer member is integrated with the central bulkhead extending into said ventilation outlet duct.

* * * * *